United States Patent
Gagnon

(10) Patent No.: US 7,327,689 B2
(45) Date of Patent: Feb. 5, 2008

(54) DATA PROCESSING EQUIPMENT WITH MULTI-FUNCTION TRACE MESSAGE PROCESSOR

(75) Inventor: Ronald J. Gagnon, Nepean (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 995 days.

(21) Appl. No.: 10/207,913

(22) Filed: Jul. 31, 2002

(65) Prior Publication Data

US 2004/0022197 A1    Feb. 5, 2004

(51) Int. Cl.
H04L 1/08 (2006.01)
H04J 3/14 (2006.01)
H04B 17/02 (2006.01)
H06F 11/00 (2006.01)

(52) U.S. Cl. .......... 370/243; 370/509; 398/18; 714/799

(58) Field of Classification Search .......... 370/243, 370/509; 398/18; 714/799
See application file for complete search history.

(56) References Cited

U.S. PATENT DOCUMENTS

| | | | |
|---|---|---|---|
| 6,222,848 B1 * | 4/2001 | Hayward et al. | 370/412 |
| 6,246,668 B1 * | 6/2001 | Kusyk | 370/228 |
| 6,611,871 B1 * | 8/2003 | Kada et al. | 709/238 |
| 6,782,009 B1 * | 8/2004 | Giorgetta et al. | 370/539 |
| 6,829,741 B1 * | 12/2004 | Khansari et al. | 714/755 |
| 6,915,348 B1 * | 7/2005 | Roberts | 709/236 |
| 6,975,657 B1 * | 12/2005 | Diaconescu et al. | 370/476 |
| 7,031,252 B1 * | 4/2006 | Hosler et al. | 370/217 |
| 7,043,668 B1 * | 5/2006 | Treue et al. | 714/45 |
| 7,055,070 B1 * | 5/2006 | Uhler et al. | 714/45 |
| 7,068,608 B2 * | 6/2006 | Mattson et al. | 370/241 |
| 7,162,536 B1 * | 1/2007 | Roberts et al. | 709/237 |
| 2002/0167912 A1 * | 11/2002 | Melville et al. | 370/252 |

* cited by examiner

Primary Examiner—Alpus H. Hsu

(57) ABSTRACT

A data processing equipment having an input to receive an input stream of data frames. The data frames contain a repeating trace message, each instance of the trace message being divided in fragments distributed over a series of data frames. The data processing equipment further includes a trace message processor receiving the repeating trace message in the input stream. The trace message processor performs a first action when the input stream carries less than N consecutive anomalous instances of the trace message and a second action different from the first action when the input stream carries N or more consecutive anomalous instances of the trace message.

23 Claims, 2 Drawing Sheets

DATA PROCESSING EQUIPMENT WITH MULTI-FUNCTION TRACE MESSAGE PROCESSOR

FIELD OF THE INVENTION

The invention relates to a data processing equipment that receives an input stream of data frames containing a repeating message, such as a trace message. The data processing equipment has a message processor that performs different actions depending on the number of anomalous instances of the message consecutively received by the data processing equipment.

BACKGROUND OF THE INVENTION

Trace messages are used in electronic data communication installations to provide end-to-end connectivity check. A typical trace message is a repeating message. Each instance of the message is divided in fragments and distributed over a series of data frames. Under the SONET standard, a trace message has 64 bytes, and each data frame carries 1 byte of the message. Hence, an instance of the trace message is distributed over 64 frames. A trace message byte can be carried in the J1 byte slot to provide a path layer connectivity check. The J0 byte slot is reserved for trace message bytes that provide end-to-end connectivity check at the section layer. Although not currently implemented, trace messages can also be used to provide end-to-end connectivity check at the line layer.

Under the SDH standard, a typical trace message has 16 bytes.

Trace messages propagating in a communication link are subjected to very basic processing techniques when they are received by an intermediate device on the communication link or by a terminal device. In the case of an intermediate device, the trace message is simply retransmitted. In the case of a terminal device, a check is performed to determine if anomalies are present in the received instance of the message. In the affirmative, an alarm is triggered.

Sometimes, anomalies in a trace message can occur as a result of overhead slips in a Transparent Multiplexing (TMUX) connection caused by frequency offsets between processing equipment and the TMUX connection. Such overhead slips induce spurious anomalies in one or more trace message instances that can trigger false alarms in the terminal device.

Against this background, there appears the need in the industry to provide more sophisticated techniques to process trace messages in a communication network.

SUMMARY OF THE INVENTION

Under a first broad aspect, the invention provides data processing equipment having an input to receive an input stream of data frames. The data frames contain a repeating message, such as a trace message, each instance of the message being divided in fragments distributed over a series of data frames. The data processing equipment further includes a message processor receiving the repeating message in the input stream. The message processor performs a first action when the input stream carries less than N consecutive anomalous instances of the message and a second action different from the first action when the input stream carries N or more consecutive anomalous instances of the message.

The advantage of this approach over prior art techniques lies in the ability to distinguish between spurious anomalies in the repeating message and anomalies due to a serious fault in the connection.

The invention is particularly useful in the context of trace messages, however it should be explicitly noted that the scope of the invention is not restricted to trace messages. Although the following examples of implementation of the invention make reference to trace messages, the invention could be applied to other types of repeating messages that are not trace messages.

In a specific and non-limiting example of implementation, the data processing equipment is an intermediate device, which has an output for releasing an output stream of data frames that contain a repeating trace message derived from a trace message received at the input. The first action performed by the trace message processor is to prevent the anomalous instance of the trace message to propagate to the output. This can be effected by generating a non-anomalous instance of the trace message and transmitting that instance to the output.

The repeating nature of the trace message over a series of data frames allows the trace message processor to "know" what is a non-anomalous instance of the trace message, hence this makes possible the generation of a non-anomalous instance when an anomalous instance of the trace message is detected.

The second action is triggered when too many anomalous instances (in excess of N) of the trace message are received. In a typical example, the second action is to allow the anomalous instance of the trace message to propagate at the output. The value of N is fixed or user-modifiable is user-defined.

In a second non-limiting example of implementation, the data processing equipment is a terminal device, where the trace message processor controls an alarm. The first action performed by the trace message processor is to ignore the anomalous instance and prevent triggering the alarm. The second action is to trigger the alarm.

Under a second broad aspect, the invention provides a method for processing a repeating message in a stream of data frames. The data frames contain a repeating message, each instance of the message being divided in fragments distributed over a series of data frames. The method includes performing a first action when less than N successive data frames in the stream of data frames carry an anomalous instance of the message and performing a second action different from the first action when N or more successive data frames in the stream of data frames carry an anomalous instance of the message.

Under a third broad aspect, the invention provides a signal embedded in a carrier medium, the signal conveying a stream of data frames containing a repeating message. Each instance of the message is divided in fragments distributed over a series of M data frames, repeating series of M data frames in the stream of data frames conveying successive instances of the message. The data frames in a given series of M data frames including indices associated with respective fragments of the instance of the message, each index defining the position of a respective fragment in the instance of the message.

BRIEF DESCRIPTION OF THE DRAWINGS

A detailed description of examples of implementation of the present invention is provided hereinbelow with reference to the following drawings, in which.

Figure 1:
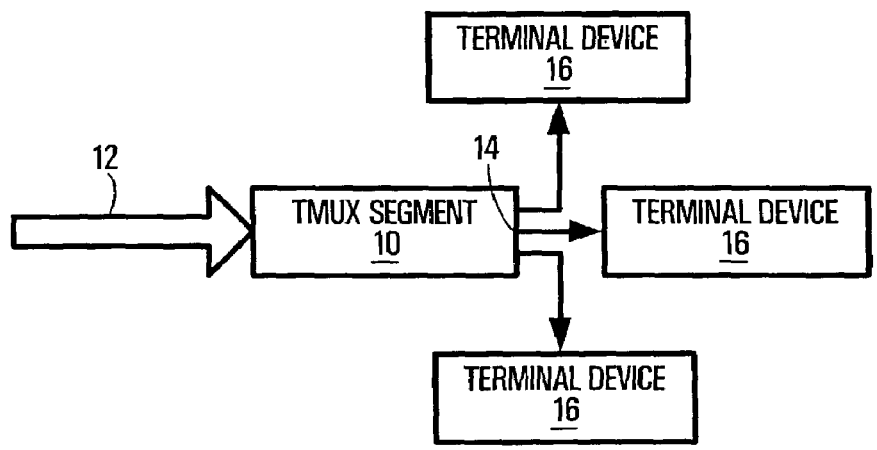
FIG. 1 is a flowchart of a communication link that carries data frames including trace messages.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a block diagram of a data communication network that operates under the SONET protocol or the SDH protocol. The specific type of protocol used is not critical; the present invention can find applications in many different communication protocols. The data communication network includes a TMUX segment 10 that receives at its input 12 several data flows that are multiplexed together. At least one of the data flows carries a trace message. Such trace message may be a path trace message, a section trace message or a line trace message. At input 12, slips in the overhead segments of the data frames can occur which may introduce anomalies in at least one trace message instance.

At the output 14 of the TMUX segment 10, the multiplexed data frames are de-multiplexed and sent to respective terminal devices 16.

Figure 2:
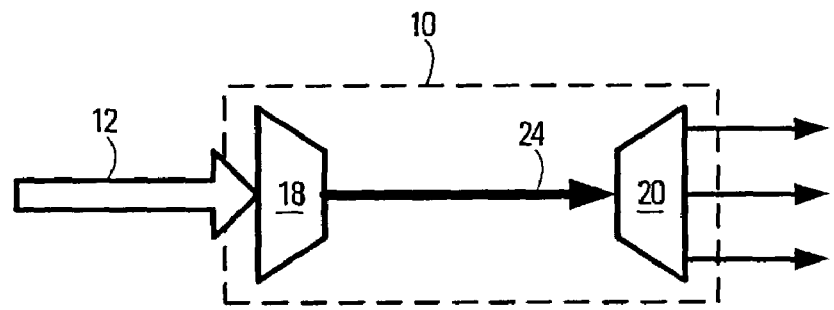
FIG. 2 is a detailed block diagram of a TMUX segment of the communication link shown at FIG. 1.
Figure 7:
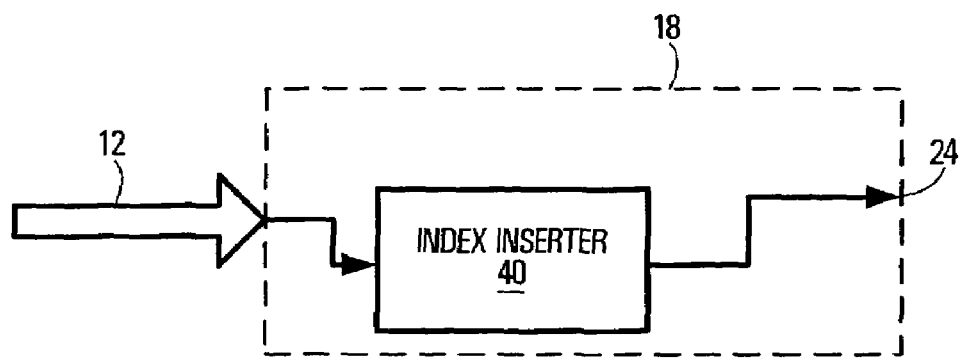
FIG. 7 is a more detailed block diagram of a multiplexer of the TMUX segment.

The TMUX segment 10 is shown in greater detail at FIG. 2. It includes a multiplexer 18 connected to a demultiplexer 20. The multiplexer 18, shown in greater detail at FIG. 7 has an input receiving the input data flows and an index inserter functional block 40. For clarity, a number of functional elements that would normally exist in such multiplexer but which are unrelated to the invention have been omitted. The purpose of the index inserter 40 is to insert an index in each fragment of a trace message that is received at the input 12. As discussed in the introductory part of this specification, a typical SONET trace message has 64 bytes divided over 64 frames. Accordingly, consecutive instances of the trace message are carried by consecutive series of 64 data frames, where each data frame carries a fragment of a trace message instance. The index inserter 40 inserts an index in the overhead part of the data frame. The index range should be equal to the number of fragments forming a complete message instance or be a factor thereof. In the case of a 64 byte trace message an index range of 16 has been found satisfactory.

In operation, when a data frame arrives at the index inserter 40, the latter will generate an index value and insert it in the overhead port of the frame. For the next data frame the index value is incremented. This is repeated until the end of the index range is reached in which case the index inserter resets itself and starts for the next data frame at the beginning of the index range. It should be noted that no alignment is required between the trace message instance and the index values inserted by the index inserter 40; the purpose of the indices placed in association with the trace message instance fragments is to allow detection of broken sequences downstream of the multiplexer 18.

The index inserter 40 can be implemented in software, hardware or a combination of software and hardware.

Figure 3:
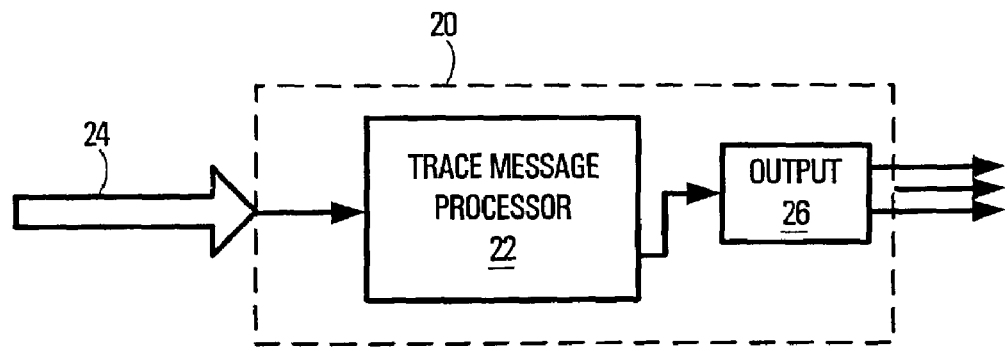
FIG. 3 is a more detailed block diagram of a demultiplexer of the TMUX segment shown at FIG. 2.
Figure 4:
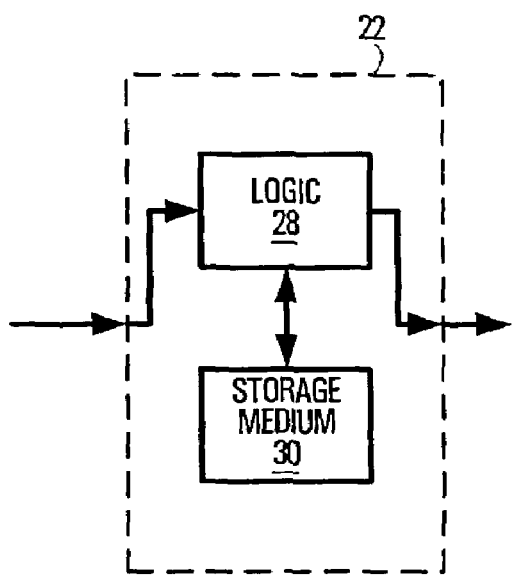
FIG. 4 is a more detailed block diagram of a trace message processor of the demultiplexer shown at FIG. 3.

The demultiplexer 20 also has a trace message processor that will be described in connection with FIGS. 3 and 4. The trace message processor, designated at 22, has an input connected to an input 24 of the demultiplexer 20 and an output connected to an output 26 of the demultiplexer 20. The purpose of the trace message processor 22 is to process the consecutive instances of one or more trace messages received by the demultiplexer and depending upon the number of anomalous trace messages consecutively received, perform different actions.

The trace message processor 22 has two main components, namely a logic block 28 and a storage medium 30. The logic block 28 can be software implemented, hardware implemented or implemented as a combination of software and hardware. The logic block 28 communicates with a storage medium 30 that contains data allowing the logic block 28 to determine that an instance of a trace message that is being received is anomalous, to generate a non-anomalous instance of a trace message or both.

An instance of a trace message is considered anomalous when the structure of the message is altered such that the message is different from what is being expected. For example, when a fragment of the trace message is missing, duplicated or the order of a fragment in the sequence of fragments forming the instance of the trace message is changed, the entire trace message instance is treated as being anomalous. An anomalous instance of a trace message may result from overhead slips occurring at the input 12. Such anomalies are of very short duration and are usually limited to a single instance of the trace message. Another source of anomalous instances of a trace message is an actual fault condition resulting from a physical conductor, such as an optical fibers being incorrectly connected on a connection panel such that the physical conductor receives data frames that should be carried over a different conductor. In this case, the anomalous instances of the trace message will likely be of persistent nature.

The periodic or repeating nature of trace message allows the logic block 28 to determine that an anomalous message is present. In a first possibility, the logic block 28 stores data in the storage medium 30 that constitutes a reference against which the logic block 28 can compare the various fragments of an instance of a trace message in order to determine if the instance of the trace message is anomalous or not. In cases where the trace message is not likely to be changed, the data can be permanently stored by specific user action and constitutes a permanent reference. Alternatively, the reference can be dynamically obtained, by randomly loading one of the instances of the trace message. Since anomalous instances of the trace message are rare events, the randomly selected instance is highly unlikely to be anomalous.

In order to determine if an instance of the trace message is anomalous or not by comparison to the reference contained in the storage medium 30, the trace message processor 22 can buffer the entire series of the data frames containing the whole instance of the message, and then compare that instance to the reference. Objectively, this is not ideal. It is preferable to handle each data frame individually and release the data frame when the assessment, as far as that data frame is concerned, has been made. One possible form of implementation is to store each fragment of the trace message that constitutes the reference in a separate slot of the storage medium 30. The logic bloc 28 implements a counter that is incremented every time a new data frame is received. The counter drives a pointer in the storage medium 30. The pointer is incremented every time the counter is incremented. The range of the counter is equal to the number of fragments in a trace message, say 64 in the case of 64 byte trace message. When the counter reaches 64 it resets and the message fragment of a newly arriving data frame is compared with the value in the data slot pointed to by the pointer. In this case, the data slot pointed to holds the data fragment at the beginning of the previous 64 frame block. This operation is currently repeated and in effect the logic bloc 28 is constantly comparing each fragment of a trace message instance to the fragment in the same position in the previous 64 byte block. If at any point there is no match between the two fragments being compared, the data frame is anomalous. It should be noted that the counter does not need to be aligned with a trace message instance. The counter can start at any position relative to a trace message instance.

A second possibility to determine that an anomalous instance of the trace message has been received is to use information in the message itself without the need to compare the instance of the message to a reference. This can be achieved by formatting the trace message in such a way that some type of discrepancies can be detected. For example, each fragment of the instance of the trace message is sent consecutively more than once. The logic block 28 expects to see fragments of the instance of the trace message repeat themselves a predetermined number of times. If the sequence is broken, the instance of the trace message is considered anomalous. Consider the following possibility. The trace message is formatted such that each fragment of the message is sent four times consecutively. In the example of a SONET trace message, such formatting implies that each byte of the trace message will be repeated four times, over four consecutive data frames. Accordingly, an instance of the trace messages will be sent over four times to 64 data frames.

The logic block 28 observes the data fragments of the instance of the trace message. When the logic block 28 sees that a given fragment is repeated less than four times, it concludes that the instance of the trace message is anomalous.

The action that the trace message processor will perform depends upon the number of consecutive anomalous instances of the trace messages received. That number constitutes a threshold that can be permanently set, user modifiable or under some circumstances dynamically changed. In a specific example of implementation, as long as less than two consecutive instances of an anomalous trace message have been received, a first action will be performed. If two or more anomalous instances of the trace message have been received, a second action, different than the first one, will be performed. As previously indicated, the number of consecutive anomalous instances of the trace message that distinguish between the first and the second action can vary and is not restricted to the specific numbers given above.

Figure 5:
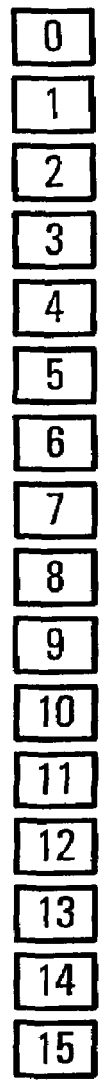
FIG. 5 illustrates in more detail a storage medium of the trace message processor shown at FIG. 4.

An example of the first action is to block propagation of the anomalous instance of the trace message in the data frames released at the output 26. This is effected by generating an instance of a trace message that is non-anomalous and then releasing that instance at the output 26. The storage medium structure shown at FIG. 5 can be used to perform this task. In this particular example, the trace message is modified such as to add in each data frame, an index that identifies the position of the data fragment in the sequence of the data fragments forming the instance of the trace message. That index can be stored in any unused slot of the overhead part of the data frame or in any other suitable location. The logic block 28, which receives the data frame, reads the index and the data fragment. Then the logic block 28 stores the data fragment in the data slot reserved for respective index. Consequently, the data fragment of the first data frame of the set of data frames conveying the instance of the trace message, will be stored in the slot marked 0, the data fragment of the next data frame in the slot marked 1, and so on. Note that for clarity, the drawing on FIG. 5 shows only 16 slots, suitable to hold 16 byte trace messages. For larger trace messages, more slots in the storage medium 30 will need to be allocated.

Assume that an anomalous instance of a trace message is received. If the anomaly is due to a missing data fragment, say data fragment #7 is missing, the logic block 28 will generate a non-anomalous instance of the trace message by extracting the data fragment from the slot #7 left from a previously received data frame that carried the #7 data fragment. Accordingly, the continuity of the trace message is maintained.

In the situation when the anomaly is the result of a data fragment and associated index duplicated over two consecutive data frames, the logic block 28 will store the two data fragments at the same location, one overwriting the other. Here too, the proper data fragment sequence in the trace message released at the output 26 will be maintained.

The storage medium arrangement shown at FIG. 5 will generate a non-anomalous instance of a trace message only when an anomalous instance of the trace message is received once. If two or more consecutive anomalous instances of the trace message are received, the anomaly will be allowed to propagate in the data frames released at the output 26. Allowing an anomaly to propagate constitutes the second action in this example.

Figure 6:
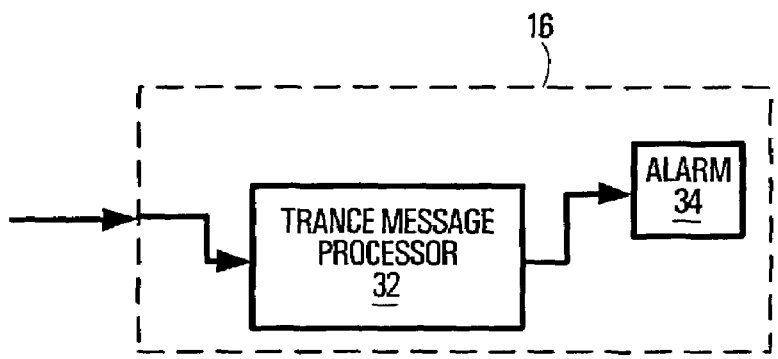
FIG. 6 is a more detailed block diagram of a terminal device shown at FIG. 1.

FIG. 6 illustrates a terminal device 16 which uses a trace message processor 32 that can be built in a similar way to the trace message processor 22 described earlier. The implementation of the invention as depicted in FIG. 6 is useful in cases where it is not desirable or practical to suppress the spurious anomalous instances of the trace message before the trace message has reached the terminal device 16. The purpose of the trace message processor 32 is to detect if an anomaly is present in an instance of the trace message and perform different actions depending on the number of consecutive anomalous instances of the trace message received.

The trace message processor 32 has an output driving an alarm 34. The first action that the trace message processor 32 can perform is to avoid triggering the alarm 34. Hence, if less than a predetermined number of consecutive anomalous trace messages are being received, the alarm 34 is not triggered. On the other hand, if the number of consecutive anomalous trace messages received equals or exceeds the predetermined number, the alarm is triggered to signal an end-to-end connection problem.

It will be noted that in contrast to the trace message processor 22, the trace message processor 32 does not need to have the ability to generate a non-anomalous instance of the trace message.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A data processing apparatus, comprising:
   a) an input to receive an input stream of data frames, the data frames containing a repeating message, each instance of the repeating message being divided in fragments distributed over a series of data frames;
   b) a message processor receiving the repeating message in the input stream, said message processor performing a first action when the input stream carries less than N consecutive anomalous instances of the repeating message and a second action different from said first action when the input stream carries N or more consecutive anomalous instances of the repeating message.

2. A data processing apparatus as defined in claim 1, wherein the repeating message is a trace message.

3. A data processing apparatus as defined in claim 2, wherein N is equal to 2.

4. A data processing apparatus as defined in claim 2, wherein the first action is to ignore the anomalous instances of the trace message.

5. A data processing apparatus as defined in claim 4, wherein the second action is to trigger an alarm.

6. A data processing apparatus as defined in claim 5, wherein the alarm indicates an end-to-end connectivity check failure.

7. A data processing apparatus as defined in claim 6, wherein the data frames in the input stream are SONET data frames.

8. A data processing apparatus as defined in claim 6, wherein the data frames in the input stream are SDH data frames.

9. A data processing apparatus as defined in claim 7, wherein the trace message is a path trace message.

10. A data processing apparatus as defined in claim 7, wherein the trace message is a line trace message.

11. A data processing apparatus as defined in claim 7, wherein the repeating message is a section trace message.

12. A data processing apparatus as defined in claim 2, wherein said message processor includes a storage medium holding data allowing detection of an anomalous instance of the trace message.

13. A data processing apparatus as defined in claim 12, wherein the data in the storage medium is representative of a non-anomalous instance of the trace message.

14. A data processing apparatus as defined in claim 2, including an output for releasing an output stream of data frames containing a repeating trace message derived from the repeating trace message in the input stream of data frames.

15. A data processing apparatus as defined in claim 14, wherein the first action is to prevent propagation of an anomalous instance of the trace message in the output steam of data frames.

16. A data processing apparatus as defined in claim 15, wherein the second action is to allow propagation of the anomalous instance of the trace message in the output stream of data frames.

17. A data processing apparatus as defined in claim 15, wherein said message processor prevents propagation of the anomalous trace message instance by generating a non-anomalous instance of the trace message.

18. A data processing apparatus as defined in claim 17, wherein said message processor includes a storage medium holding data allowing generation of a non-anomalous instance of the trace message.

19. A data processing apparatus as defined in claim 18, wherein the data in the storage medium is representative of a non-anomalous instance of the trace message.

20. A data processing apparatus, comprising:
    a) input means to receive an input stream of data frames, the data frames containing a repeating message, each instance of the message being divided in fragments distributed over a series of data frames;
    b) message processing means for receiving the repeating message in the input stream, said message processing means performing a first action when the input stream carries less than N consecutive anomalous instances of the message and a second action different from said first action when the input stream carries N or more consecutive anomalous instances of the message.

21. A data processing apparatus as defined in claim 20, wherein the repeating message is a trace message.

22. A method for processing a stream of data frames, the data frames containing a repeating message, each instance of the repeating message being divided in fragments distributed over a series of data frames, said method comprising:
    a) performing a first action when the stream carries less than N consecutive anomalous instances of the repeating message;
    b) performing a second action different from said first action when the stream carries N or more consecutive anomalous instances of the repeating message.

23. A method for processing a stream of data frames as defined in claim 22, wherein the repeating message is a trace message.

* * * * *